United States Patent
Hahlweg

(10) Patent No.: US 6,647,154 B1
(45) Date of Patent: Nov. 11, 2003

(54) METHOD FOR THE AUTOMATED JOINING OF TWO-DIMENSIONAL OBJECTS

(75) Inventor: Cornelius Hahlweg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/556,092

(22) Filed: Apr. 21, 2000

(30) Foreign Application Priority Data

Apr. 21, 1999 (DE) .......................... 199 17 938

(51) Int. Cl.[7] .................................. G06T 3/00
(52) U.S. Cl. ................. 382/284; 382/294; 382/298; 345/630
(58) Field of Search .................. 382/284, 294, 382/298; 345/629, 630, 639, 640

(56) References Cited

U.S. PATENT DOCUMENTS

| | | | | |
|---|---|---|---|---|
| 5,469,274 A | * | 11/1995 | Iwasaki et al. ............. | 358/450 |
| 5,706,416 A | * | 1/1998 | Mann et al. ................. | 345/427 |
| 5,951,475 A | * | 9/1999 | Gueziec et al. ............. | 600/425 |
| 6,173,087 B1 | * | 1/2001 | Kumar et al. ............... | 382/284 |
| 6,256,058 B1 | * | 7/2001 | Kang et al. ............. | 348/207.99 |

* cited by examiner

Primary Examiner—Jon Chang
(74) Attorney, Agent, or Firm—Kenyon & Kenyon

(57) ABSTRACT

In a method for the automated joining of two-dimensional objects, two equally large sets of points of both objects are selected, one point of the second set being assigned precisely to each point the first set, and vice versa. An equation system is solved which can be obtained by setting up a transformation equation $P_i'=T(P_i)$ for the set of points $P_i$ with variable parameters $a_j$ and by determining those values of parameters $a_j$ for which the sum of all the squared distances between the transformed points $P_i'$ and the assigned points $G_i$ of the second set assumes a minimum and the first object is plotted on the second one with the aid of the transformation equation thus obtained. The method is suitable in particular for the automatic joining of maps in a motor vehicle navigation system.

7 Claims, 2 Drawing Sheets

METHOD FOR THE AUTOMATED JOINING OF TWO-DIMENSIONAL OBJECTS

FIELD OF THE INVENTION

The present invention relates to a method for the automated joining of two-dimensional objects such as images, maps or images cropped from them.

BACKGROUND INFORMATION

Even in the context of digital image processing, the joining of images and cropped images as in photo montage is still done essentially by hand. In such a method, for example, a retoucher, selects a cropped segment from a first image which is to be incorporated in a second image at a given point, while possibly using an image processing computer to perform simple operations of distortion, enlargement or reduction in order to incorporate the selected cropped image as seamlessly as possible into the second image. The quality of the transition depends to a great extent on the skill and patience of the retoucher.

SUMMARY OF THE INVENTION

A method for the automated joining of two-dimensional objects is proposed which can be applied rapidly and reproducibly even by inexperienced persons and which opens up applications for the automated joining of objects extending far beyond photo montage.

The method includes selecting a first and a second set of points of the first and the second object, respectively, one point of the second set being assigned precisely to each point of the first set, and vice versa, then solving an equation system completely automatically which can be obtained by setting up a transformation equation T for the points of the first set with variable transformation parameters a and by determining those values of parameters a for which the sum of all the points of the squared values of the distances between a point $T(P_i)$ obtained by transformation of a point of the first set and a point $G_i$ of the second set assumes a minimum, and finally plotting the first object onto the second one with the aid of transformation equation T thus obtained. While the points of the two sets are advantageously selected by a user, the subsequent calculation of the transformation equation and the plotting are well suited to being accomplished fully automatically by a computer or the like. The computational technique of the method can be kept particularly simple if each point is represented by a complex number.

Conventional methods of analysis can be used to determine the values sought for parameters a.

A preferred special case of the method according to the present invention is a method for the automated joining of two-dimensional objects in which transformation function T has the form of a polynomial. In this case, the values of parameters a, for which the sum of the squared distances between the transformed points of the first set and the assigned points of the second set assumes a minimum, are given by equation system 1.

$$\begin{pmatrix} \sum_i G_i P_i^{n*} \\ \vdots \\ \sum_i G_i P_i^* \\ \sum_i G_i \end{pmatrix} = \begin{pmatrix} \sum_i P_i^n P_i^{n*} & \cdots & \sum_i P_i P_i^{n*} & \sum_i P_i^{n*} \\ \vdots & & \vdots & \vdots \\ \sum_i P_i^n P_i^* & \cdots & \sum_i P_i P_i^* & \sum_i P_i^* \\ \sum_i P_i^n & \cdots & \sum_i P_i & \sum_i 1 \end{pmatrix} \begin{pmatrix} a_n \\ \vdots \\ a_1 \\ a_0 \end{pmatrix} \quad (1)$$

The solution of such linear equation systems poses no difficulties of any kind and can be accomplished fully automatically with an appropriately programmed computer or microprocessor.

If the number of free parameters a is equal to the number m of points of the first set, then a transformation T is obtained, which plots each point $P_i$, i=1, . . . , m of the first set precisely onto the corresponding point $G_i$ of the second set. Thus, in the case of a photo montage, there is no difficulty at all in causing any number of transitions of contours or lines that intersect the boundary lines of joined images to merge continuously, a user first selecting end points of these lines or contours that are intended to match and to coincide at each of the edges of the two images, the transformation equation then being calculated by a computer. Thus, the boundary line can be made to be extremely inconspicuous and the montage practically unrecognizable as such.

In a preferred application of the method, each of the objects is a map stored on a data medium and the joined objects are displayed on a screen. Such a method is suitable for use in a vehicle navigation system in particular.

DETAILED DESCRIPTION

The exemplary embodiment deals with the application of the method according to the present invention within the context of a motor vehicle navigation system. In a conventional manner, such a system includes a processor with bulk storage containing maps of a region in which the motor vehicle is moving, and a screen to display individual maps or segments of these maps, which the processor selects as a function of the momentary position of the vehicle.

Figure 2:
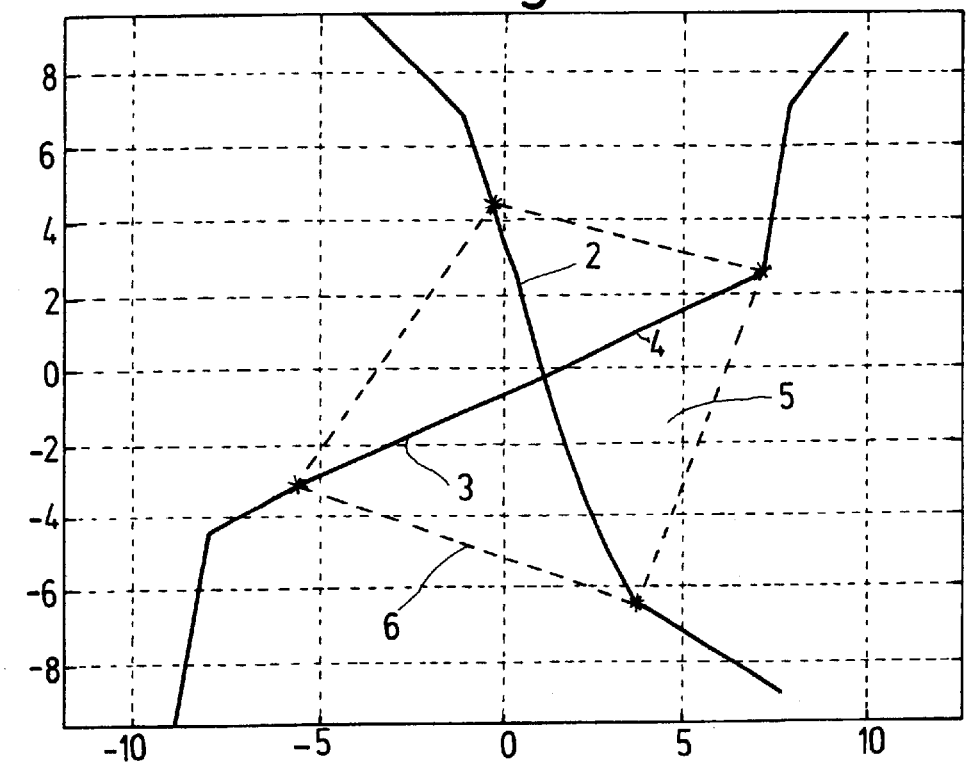
FIG. 2 is a second illustration of two objects to be joined together.
Figure 1:
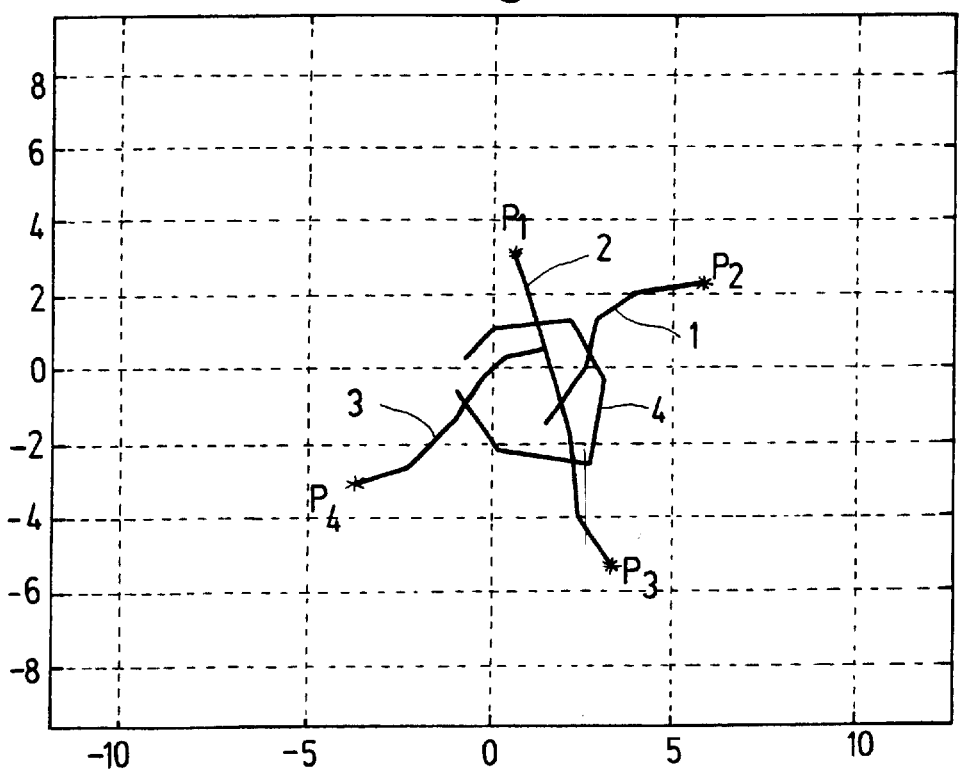
FIG. 1 is a first illustration of two objects to be joined together.
Figure 3:
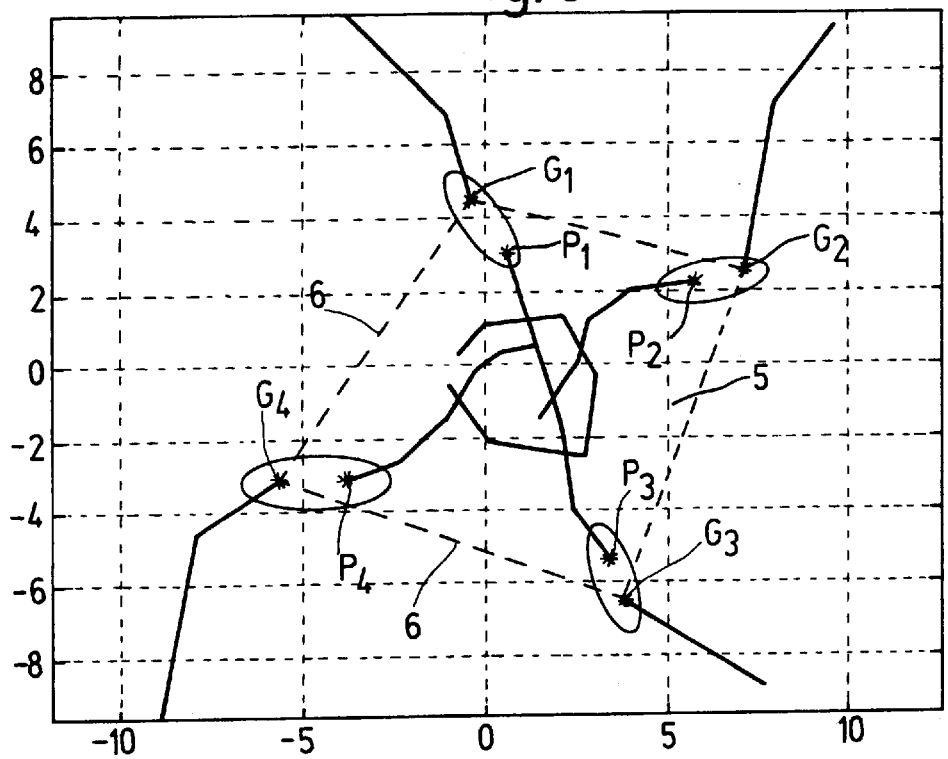
FIG. 3 shows an overlay of the objects without coordinate transformation.

FIG. 1 provides a view of the display screen of such a system. The display screen shows a town map with streets 1, 2, 3, 4 in diagrammatic form. The town map is more detailed than a regional map also stored in bulk storage, of which FIG. 2 shows a segment. A driver of a vehicle approaching the city from the outside, for example, on road 3, first receives the map of FIG. 2 displayed on the screen of his navigation system. If it is necessary for him to drive through the town, the information offered by the regional map is not sufficient. It is therefore desirable for the driver to receive a display of the town map of FIG. 1 when the vehicle enters urban area 5 bordered by dashed lines 6 in FIG. 2; on the other hand it is not advantageous to switch abruptly from the regional map of FIG. 2 to the town map of FIG. 1 since such a change can make orientation more difficult for the driver and, in addition, the town map does not contain information concerning the surroundings of the town which are present on the regional map. A simple linear overlay of the two objects, the regional map and the town map, is not a satisfactory solution, as FIG. 3 shows. Differences in scale and inaccuracies in the data material (which can easily occur, for example, when data from different sources is used for different maps of a navigation system) have the result that endpoints $P_1$ to $P_4$ of streets 1, 2, 3 of the town map do not coincide with points $G_1$ to $G_4$ which correspond to them geographically. The result of this can be that—particularly in a very detailed town map—it can no longer be clearly recognized which of several streets in the vicinity of point $P_i$ is in fact the continuation of the street at point $G_1$.

To respond to this problem, the coordinates of points $G_1$ to $G_4$ of the regional map corresponding to points $P_1$ to $P_4$ of the town map and conversely the coordinates of points $P_1$ to $P_4$ corresponding to points $G_1$ to $G_4$ of the regional map are stored in the bulk storage of the navigation system. Before the navigation system superimposes the town map of FIG. 1 on the regional map of FIG. 2—or conversely in the case of a car moving out of the town, it additionally displays the regional map of FIG. 2 around the town map of FIG. 1—it calculates a transformation formula using the stored correspondences of points $P_1$ to $P_4$, $G_1$ to $G_4$, which makes it possible to join both maps seamlessly. For this calculation, each of points $P_1$ to $P_4$ is characterized by two coordinate values which are here understood to be the real part and imaginary part of a complex number. Each of these real parts and imaginary parts is plotted on the ordinate and abscissa of the figures.

Transformation T is in the form of a polynomial $$P_i' = T(P_i) = a_n \cdot P^n + a_2 \cdot P^2 + a_1 \cdot P + a_0 \qquad (2)$$

Coefficients $a_n$ to $a_0$ are understood to be complex numbers in this case as are points $P_i$, $G_i$.

The best transformation T is the one for which the sum of the squares of the distances between transformed points $P_i' = T(P_i)$ and destination points $G_i$ is minimal. This requirement can be written as $$\sum_i (P_i' - G_i) \cdot (P_i' - G_i)^* \Rightarrow \text{Min} \qquad (3)$$

Combining equations 2 and 3 results in the following:

$$\sum_i (a_n \cdot P_i^n + \cdots + a_2 \cdot P_i^2 + a_1 \cdot P +_i a_0 - G_i) \cdot \qquad (4)$$
$$(a_n \cdot P_i^n + \cdots + a_2 \cdot P_i^2 + a_1 \cdot P_i + a_0 - G_i)^* \Rightarrow \text{Min}$$

From this it is possible to obtain equation system (1) by forming the partial derivations $$\frac{\delta}{\delta a_j^*},$$

j=0,1 . . . , n. This equation system (1) has an unambiguous solution if the number of coefficients $a_j$ is equal to or less than the number of points $P_1$ to $P_4$, and $G_1$ to $G_4$, respectively. If the number of coefficients $a_j$ is selected to be equal to the number of points in a set, the transformation formula obtained plots points $P_i$ exactly in each instance on points $G_i$.

By setting up and solving equation system (1) for four coefficients $a_0$ to $a_3$, a transformation formula T with the following parameters is obtained in the case of the town map from FIG. 1

Figure 4:
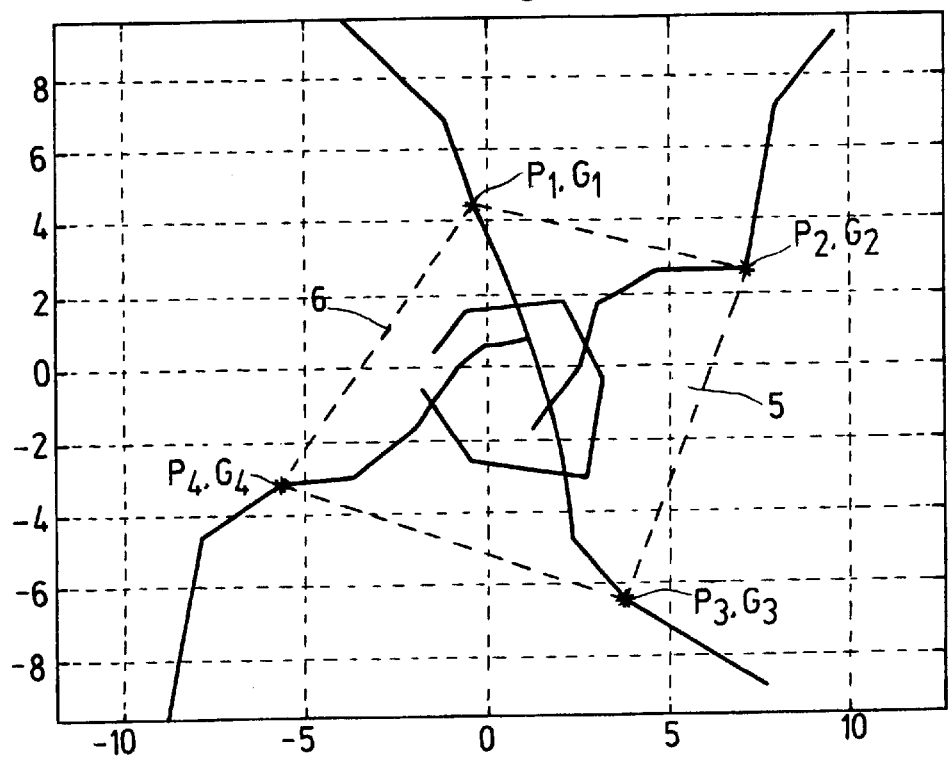
FIG. 4 shows the two objects joined according to the method of the present invention.

$a_3 = 0.024 - 0.024i$
$a_2 = 0.0190 + 0.0011i$
$a_1 = 1.2201 + 0.0043i$
$a_0 = 0.6234 + 0.01307i$ which plots points $P_1$ to $P_4$ exactly on points $G_1$ to $G_4$. By applying obtained transformation T to all the points of the town map of FIG. 1, a transformed town map is obtained which is seamlessly incorporated into the regional map along dashed lines 6, as is shown in FIG. 4.

What is claimed is:
1. A method for achieving an automated joining of two-dimensional objects, comprising the steps of:
   selecting a first set of points of a first one of the two-dimensional objects;
   selecting a second set of points of a second one of the two-dimensional objects;
   assigning one point of the second set to each point of the first set;
   assigning one point of the first set to each point of the second set;
   solving an equation system by performing the steps of:
      setting up a transformation equation for points of the first set with a plurality of variable parameters and
      determining those values of the plurality of variable parameters for which a sum of all squared values of distances between a transformed point of the first set and a corresponding point of the second set assumes a minimum; and
   plotting the first one of the two-dimensional objects on the second one of the two-dimensional objects in accordance with the transformation equation;
   wherein each point of each one of the first set and the second set is represented by a complex number.
2. A method for achieving an automated joining of two-dimensional objects, comprising the steps of:
   selecting a first set of points of a first one of the two-dimensional objects;
   selecting a second set of points of a second one of the two-dimensional objects;
   assigning one point of the second set to each point of the first set;
   assigning one point of the first set to each point of the second set;
   representing each point of the first set and of the second set by a respective complex number;
   solving an equation system including a transformation equation and corresponding to:

$$\begin{pmatrix} \sum_i G_i P_i^{n*} \\ \vdots \\ \sum_i G_i P_i^* \\ \sum_i G_i \end{pmatrix} = \begin{pmatrix} \sum_i P_i^n P_i^{n*} & \cdots & \sum_i P_i P_i^{n*} & \sum_i P_i^{n*} \\ \vdots & & \vdots & \vdots \\ \sum_i P_i^n P_i^* & \cdots & \sum_i P_i P_i^* & \sum_i P_i^* \\ \sum_i P_i^n & \cdots & \sum_i P_i & \sum_i 1 \end{pmatrix} \begin{pmatrix} a_n \\ \vdots \\ a_1 \\ a_0 \end{pmatrix}; \text{ and}$$

plotting the first one of the two-dimensional objects on the second one of the two-dimensional objects in accordance with the transformation equation.
3. The method according to claim 1, wherein:
   a number of the plurality of variable parameters is equal to a number of points of the first set.
4. The method according to claim 1, wherein:
   the points of the first one of the two-dimensional objects are selected on one edge of the first one of the two-dimensional objects.
5. The method according to claim 1, wherein:
   each one of the two-dimensional objects is a map stored in a data medium, and
   when joined, the two-dimensional objects are displayed on a screen.
6. The method according to claim 1, wherein:
   the method is performed in a vehicle navigation system.
7. The method according to claim 1, wherein:
   the transformation equation is a polynomial.

* * * * *